United States Patent [19]

Matthews et al.

[11] 3,720,887

[45] March 13, 1973

[54] FREQUENCY DETERMINING NETWORK

[75] Inventors: Terence Matthews; Charles N. Gold, both of Kanata; Michael C. J. Cowpland, Ottawa, all of Ontario, Canada

[73] Assignee: Microsystems International Limited, Montreal, Quebec, Canada

[22] Filed: Feb. 22, 1972

[21] Appl. No.: 228,178

[52] U.S. Cl. ...............331/142, 331/140, 333/70 CR

[51] Int. Cl. ...............H03b 5/26

[58] Field of Search......331/110, 135, 142, 140, 141; 333/70 CR

[56] References Cited

UNITED STATES PATENTS 3,569,863 3/1971 Cowpland ...........................331/110

*Primary Examiner*—John Kominski

*Attorney*—Edward E. Pascal

[57] ABSTRACT

A frequency determining resistance leg of an oscillator is constructed as a ladder network, each of the resistors having a value relationship to each other defined by a specific set of simultaneous equations related to frequency parameters of the oscillator. The resulting resistor values comprise a ladder network which, when connected to an oscillator through a push button pad, causes oscillation of the oscillator at predetermined frequencies having specific band widths; but when two adjacent push buttons are pushed, oscillation signals are generated at defined out-of-band frequencies.

7 Claims, 5 Drawing Figures

PATENTED MAR 13 1973

3,720,887

FREQUENCY DETERMINING NETWORK

This invention is related to frequency determining networks, and particularly to a relationship of the values of resistances used in a resistance leg of a frequency determining filter.

It has become common to send signals along telephone lines or trunks, etc., by the use of tones or groups of tones; for instance, multifrequency tone signalling is used on trunk circuits between telephone switching offices. Tone generating equipment is well defined for automatic signalling, and little chance for error, barring equipment failure, exists.

However with the advent of manual push button dialling at the subscriber's station set, there is a possibility of the introduction of error. In particular, as the push button pad is reduced in size with modernization and miniaturization of station sets, the probability of pushing more than one button accidently increases.

Should two push buttons be pressed, a local oscillator which sends out tones to a central office is usually caused to oscillate in one of two possible error modes: either a single tone, represented by one of the two push buttons is actually generated; or a completely different erroneous tone is generated. The former problem usually occurs in a circuit in which frequency determining resistors are connected to the oscillator by means of the push button switches, the resistors being connected in series with each other. Depressing two push buttons at the same time can erroneously connect a lower resistance than the one desired, to the oscillator. The second problem usually occurs in a circuit in which the frequency determining resistors are connected in parallel through the push button switches. Pushing two buttons at the same time can connect a lower combined resistance than any of the desired resistances, to the oscillator.

It is becoming increasingly more important to design push button actuated oscillators of these types to be fail-safe, that is, to ensure that the oscillator will oscillate at a clearly out-of-band frequency should two adjacent push buttons be accidently pushed, in order to avoid misdialling.

In both cases described above, where the frequency determining resistors are connected either in series or in parallel, there is only a single degree of freedom in which the values of the resistors may be adjusted; they are set wholly by the required frequency of oscillation of the oscillator. It is a feature of the present invention that two degrees of freedom are made available, whereby both the frequencies determined by the values of the resistors, and the change in frequency caused by the accidential pushing of two adjacent buttons, may be varied.

In general, where an oscillator has a frequency determining resistance leg, the resulting frequency is generated when the resistance leg is connected thereto, for instance by means of a push button switch on a push button pad. The frequency of oscillation is detected at the other end of the subscriber's line by a receiver. Both the oscillator and receiver are tuned to the same frequencies. In order that the system should be immune from the aforementioned error signals, any combination of resistances in the resistance leg of the oscillator other than that required for the generation of the desired frequency must cause generation of a frequency which is changed from the desired frequency more than one half the band width of the receiver plus tolerances at the desired frequency.

It has been found that the provision of a resistance ladder network, rather than the aforementioned series or parallel networks can provide the error immunity, provided the values of the resistances are determined according to a relationship defined by a series of equations, to be described below.

A full understanding of the invention will be obtained by reference to the detailed description and the drawings which follow, in which.

Figures 1, 2, 3:
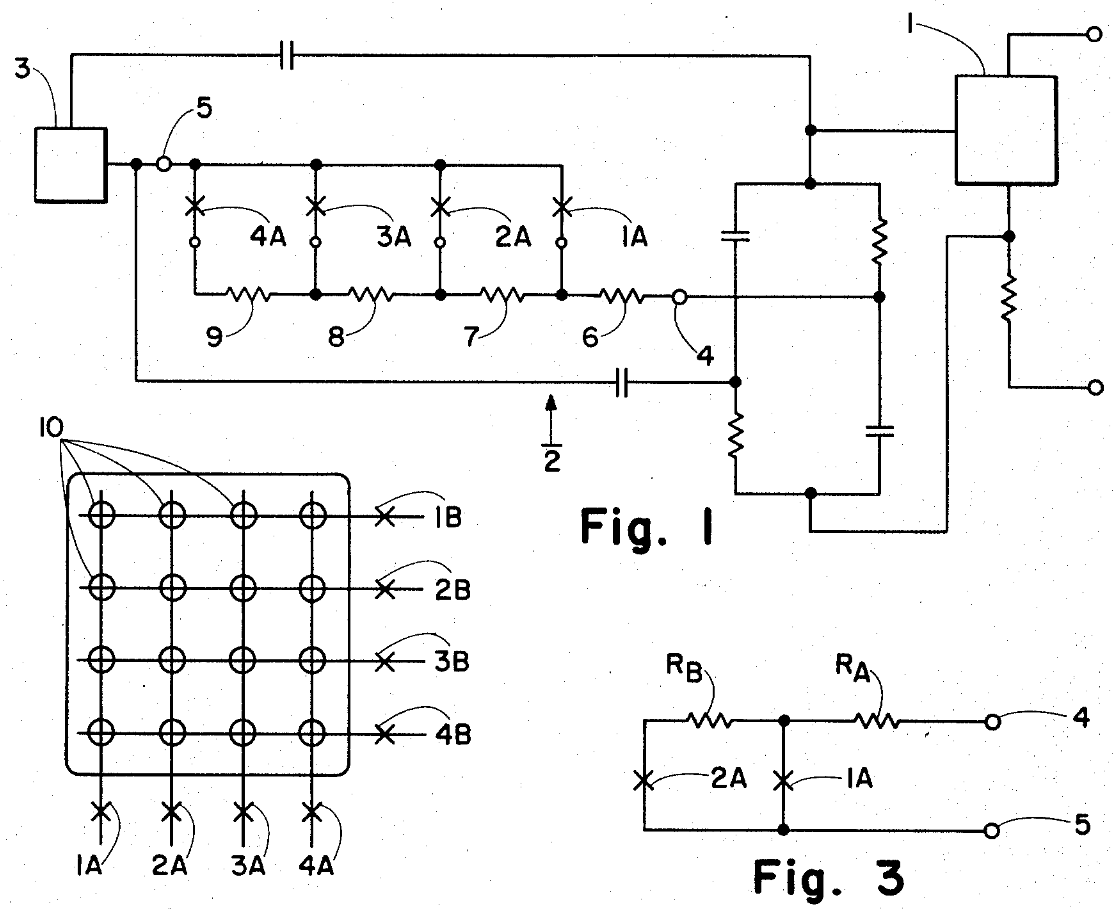
FIG. 1 is a schematic, partially in block form, of a filter network in conjunction with an amplifier, forming a tone oscillator.
FIG. 2 is a representation of certain features of a push button pad.
FIG. 3 is a simplified schematic of the frequency determining resistance leg of a filter network.

Turning now to FIG. 1, the basic elements of a frequency determining oscillator are shown, the latter being similar to the one described in U.S. Pat. application, Ser. No. 117,400 by M.C. Cowpland, filed Feb. 22, 1971, and entitled Temperature Stable Tone Generator. The parts of the tone generator shown in FIG. 1 are emitter follower amplifier 1, parallel-T R-C filter 2, and clipping circuit 3. However, this invention is applicable to all oscillators in which the frequency may be set or varied by the allocation of values of a resistance between a pair of terminals.

A resistance leg of the filter network which includes the resistors found between terminals 4 and 5 is used to determine the frequency of oscillation of the oscillator. Push button switches 1A, 2A, 3A, and 4A connect series resistors 6, 7, 8, and 9 in series combinations of either resistors 6, 6 and 7, 6, 7, and 8, or 6, 7, 8, and 9, in a path between terminals 4 and 5. The resulting variation of the resistance values between terminals 4 and 5 determines, in conjunction with the filter and oscillator, the frequency of oscillation of the oscillator.

It may be seen that if adjacent switches 1A and 2A are accidentally pushed together, while only switch 2A were intended, resistor 7 would be completely short-circuited by switch 1A. This would result in only resistor 6, rather than the series of resistors 6 and 7, appearing between terminals 4 and 5. An error frequency is thus generated.

FIG. 2 shows a representation of a telephone or other station apparatus push button pad. The array of 4 × 4 circles 10 represent 16 push buttons, although it is more common to have four rows of 3, rather than four rows of 4 buttons on a push button telephone set. It is usual for such station apparatus to combine two sets of audio frequencies, one group of four frequencies in a so-called high band, and one group of four frequencies in a so-called low band. If any push button is pushed, two frequencies would be generated, one in the low band common to that particular row, and one in the high band common to that particular column.

As an example, pushing any button in the first column will generate the frequency caused by closing switch 1A of FIG. 1. Each group of buttons in the second, third, and fourth columns close switches 2A, 3A, and 4A respectively. Similarly, the four rows of buttons close switches (not shown) which may be defined as 1B, 2B, 3B, and 4B respectively, which correspond to switches 1A, 2A, 3A, and 4A, but are connected to a high band oscillator.

It may be seen that if it is desired to push the button in the second row, second column, a pair of frequencies represented by the closing of switches 2A and 2B would be generated. However, should a user, while pushing the aforementioned switch also accidentally push the switch in the second row, the first column as well, for instance because of the possession of a thick finger or an error in aiming the finger, it will be seen that both switches 1A and 2A will be depressed, causing one correct and one error frequency turned on by switches 1A and 2B, rather than 2A and 2B, to be generated, as described in the earlier example with respect to FIG. 1. The error frequency generated is directly in the frequency band of an undesired digit.

Similar problems, of course exist with respect to the other push buttons and resistances, but for the sake of clarity we will confine ourselves now to the single example.

Turning to FIG. 3, let us now consider only resistances 6 and 7 of FIG. 1, relabled as resistors $R_A$ and $R_B$ respectively. Resistors $R_A$ and $R_B$ are in series, and switch 1A connects their junction with common point terminal 5, while switch 2A connects the other terminal of resistor $R_B$ to the same terminal.

Figure 4:
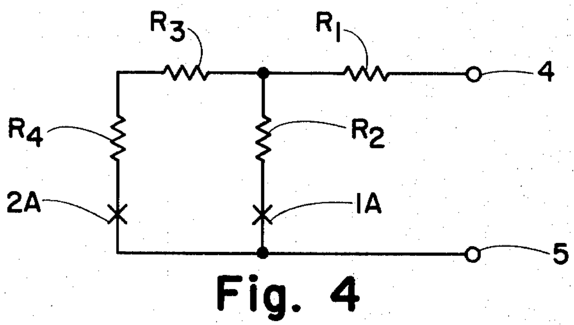
FIG. 4 is a resistance leg according to the present invention corresponding to the one shown in FIG. 3.

According to the present invention, the series network shown in FIG. 3 may be converted to the ladder network of FIG. 4 according to a relationship to be described below. The ladder network in FIG. 4 is comprised of resistor $R_1$ in series with resistor $R_2$, resistor $R_2$ being in parallel with resistors $R_3$ and $R_4$ connected in series. Means for connecting each of resistors $R_2$ and $R_4$ shown as make switches 1A and 2A, connect resistors $R_2$ and $R_4$ respectively together at junction point 5.

The values of resistors $R_1$, $R_2$, $R_3$, and $R_4$ are calculated as follows. Resistors $R_A$ and $R_B$ have been previously determined with respect to FIGS. 1 or 3 as the values of the resistors required in the resistance leg between terminals 4 and 5 to provide two distinct frequencies for an oscillator.

It is required that if two adjacent switches, such as switches 1A and 2A are pushed, the frequency resulting should be out of the frequency bands of the normal frequencies generated by the oscillator and of the receiving band width of the corresponding receiver. Accordingly, a particular resulting frequency variation or change is predetermined to remove the resulting frequency generated out of the undesired frequency bands. The value $F$ is therefore defined as the ratio of the amount of frequency change required to remove the frequency out of a defined frequency band, with the center frequency of the band.

By testing a specific oscillator, one can determine the oscillator frequency change caused by a change in resistance of the resistance leg described earlier. Accordingly, the value $S$ is defined as the ratio of the percent change in resistance of the resistance leg, and the percent change in frequency of the oscillator caused by the change of resistance of the resistance leg. This value has been found to be normally less than unity.

According to this invention, the resistance values of resistors $R_1$, $R_2$, $R_3$, and $R_4$ are determined by the solution of the three simultaneous equations:

$$R_1 + R_2 = R_A$$

$$R_1 + R_3 + R_4 = R_B + R_A$$

$$R_1 + \frac{R_2(R_3 + R_4)}{R_2 + R_3 + R_4} = R_A - \left(\frac{F}{S}\right) R_A$$

taking $R_3 + R_4$ as a single unknown for each iteration.

In calculating the remaining values for the complete network, the value of $R_A$ of FIG. 3 would be first considered as the total value of resistors 6 and 7 of FIG. 1, and the value of $R_B$ would be that of resistor 8. In the next calculation, the value of $R_A$ would be the total of the values of resistors 6, 7, and 8 while $R_B$ would be the value of resistor 9.

Figure 5:
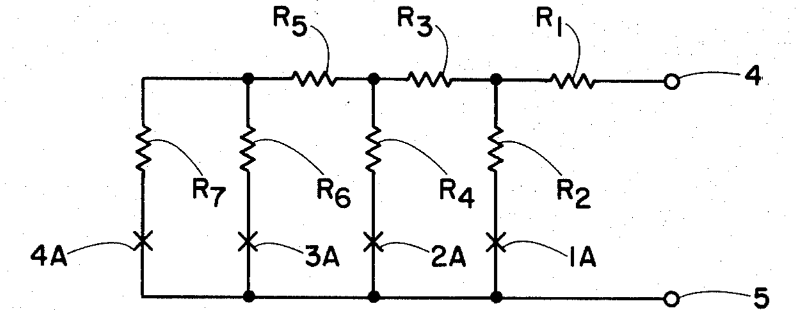
FIG. 5 is a schematic of a complete resistance leg according to this invention corresponding to the one shown in FIG. 1.

FIG. 5 shows a schematic of the complete ladder network which would be substituted for the series resistor network shown in FIG. 1, between terminals 4 and 5. Resistor $R_1$ is in series with resistor $R_2$ which is in series with switch 1A of the push button pad, connected to terminal 5. In parallel with resistor $R_2$ is resistor $R_3$ in series with resistor $R_4$ and switch 2A, similarly connected to terminal 5. In parallel with resistor $R_4$ are resistors $R_5$ and $R_6$ in series with switch 3A, also connected to terminal 5. In parallel with resistor $R_6$ is resistor $R_7$ in series with switch 4A, connected to terminal 5.

It has been found that with a frequency determining resistance leg constructed according to the ladder network shown in FIG. 5 with values determined by the equations noted above, closing of adjacent switches will cause frequencies to be generated which are out of the frequency bands generated by the associated oscillator.

This invention can be applied to any oscillator in which variation of a resistance causes change in the frequency generated, and where the sensitivity value $S$ is less than unity. For instance the entire structure can be of the type in which a signal is obtained from an intermediate stage of the amplifier, the preceding amplification stages and a filter connected between the intermediate signal terminal and the amplifier input circuit constituting the oscillator. There may additionally be multiple feedback loops which cause generation of the oscillator signal. As described in the aforementioned tone generator patent application, the amplifier can have a voltage gain of less than unity, and the filter network have a voltage gain of greater than unity, provided the loop voltage gain is greater than unity. A parallel-T R-C filter has been found useful in the latter structure. As noted above, however, the prime requirement for all such applications, is that a filter resonance or frequency determining resistance leg be present which can be varied to establish the oscillation frequencies. It will also be obvious that while the example given was directed to the conversion of series resistances to a ladder network, an equivalent circuit may be derived for the conversion of parallel resistances to a ladder network.

A specific example will now be described.

It was found by test that the sensitivity $S$ of one embodiment of the tone generator described in the afore-mentioned U.S. Pat. application, Ser. No. was .35. For that system, the ratio of the change in frequency required to remove the oscillation frequency out of a defined single oscillation frequency band, with the center frequency of the single frequency, that is, the change in frequency required to avoid an error signal following within a frequency band width normally generated by the oscillator was 0.04, allowing a 0.5 percent guard band. This is the value $F$.

Accordingly, the value $F/S$ equals (0.04)/(0.35) or 0.114.

Typical values of resistors 6, 7, 8 and 9 of FIG. 1 as found in the low band oscillator of the afore-mentioned tone generator, are 42,000 ohms, 14,000 ohms, 19,000 ohms, and 25,000 ohms respectively. Accordingly, for the first calculation, $R_A$ is 42,000 ohms and $R_B$ is 14,000 ohms.

The solution to the equations gives a figure of $R_1$ equal to 27,727 ohms, $R_2$ to 14,273 ohms, $R_3$ to 9,100 ohms, and $R_4$ of 19,120 ohms.

In the second calculation, $R_A$ will be equal to 42,000 ohms plus 14,000 ohms or 56,000 ohms, while $R_B$ will be 19,000 ohms. Solving again for $R_3$ and $R_4$ (i.e. $R_5$ and $R_6$) gives the solutions 12,633 ohms and 25,487 ohms respectively.

In the third calculation, $R_A$ is equal to 42,000 ohms plus 14,000 ohms plus 19,000 ohms or 75,000 ohms, while $R_B$ is 25,000 ohms. Solving for $R_3$ and $R_4$ equals 50,486 ohms combined in a single resistor $R_7$.

Each of the solutions above provides the required frequency shift of 4 percent should two adjacent switches be pushed, out of the frequency band generated by the oscillator when a single switch is closed. Accordingly, a push button pad is rendered error free when two adjacent push buttons are depressed. Another calculation may be made with a wider frequency shift in order to determine the direction in which the resistor values can be varied with safety, for instance during a trimming operation.

It is to be understood that the above described arrangements are illustrative of the application of the principles of the invention. Numerous other arrangements may be devised by those skilled in the art without departing from the spirit and scope of the invention.

What is claimed is:

1. A ladder network frequency determining resistance leg for an oscillator circuit comprising an $R_1$ resistance, in series with an $R_2$ resistance which is in parallel with an $R_3$ resistance in series with an $R_4$ resistance, and means for connecting each of the $R_2$ and $R_4$ resistances together at a junction point through individual switches, the values of the resistances $R_1$, $R_2$, $R_3$ and $R_4$ having a relationship to a second frequency determining resistance leg for an oscillator circuit of similar frequency comprising known resistance $R_A$ in series with known resistance $R_B$, including means for connecting the junction of $R_A$ and $R_B$ and the other terminal of $R_B$ to a common point through individual switches, according to the solution of the three simultaneous equations:

$$R_1+R_2=R_A$$

$$R_1+R_3+R_4=R_B+R_A$$

$$R_1+\frac{R_2(R_3+R_4)}{R_2+R_3+R_4}=R_A-\left(\frac{F}{S}\right)R_A$$

where $F$ = the ratio of the amount of frequency change required to remove the frequency of oscillation of the oscillator out of a defined frequency band, with the center frequency of said band, and $S$ = the ratio, less than unity, of the percent change in resistance of the resistance leg, and the percent change in frequency of oscillation of said oscillator caused by the change of resistance of the resistance leg.

2. A ladder network as defined in claim 1, in which $F$ = about 0.04 and $S$ = about 0.35.

3. A ladder network as defined in claim 2, in which $R_A$ is about 42,000 ohms and $R_B$ is about 14,000 ohms.

4. A ladder network as defined in claim 2 in which $R_A$ is about 56,000 ohms and $R_B$ is about 19,000 ohms.

5. A ladder network as defined in claim 2 in which $R_A$ is about 75,000 ohms and $R_3$ is about 25,000 ohms.

6. In combination, an apparatus comprising an amplifier having an input circuit and signal terminal means for deriving a signal therefrom, a filter network having a resonance determining resistance leg connected between the signal terminal means and the input circuit, the resistance leg comprising an $R_1$ resistance, in series with an $R_2$ resistance which is in parallel with an $R_3$ resistance in series with an $R_4$ resistance, and means for connecting each of the $R_2$ and $R_4$ resistances together at a junction point through individual switches, the values of the resistance $R_1$, $R_2$, $R_3$ and $R_4$ having a relationship to a second resonance determining resistance leg for a second filter network connected to a similar second amplifier for generation of similar frequencies comprising known resistance $R_A$ in series with known resistance $R_B$, including means for connecting the junction of $R_A$ and $R_B$ and the other terminal of $R_B$ to a common point through individual switches, according to the solution of the three simultaneous equations:

$$R_1+R_2=R_A$$

$$R_1+R_3+R_4=R_B+R_A$$

$$R_1+\frac{R_2(R_3+R_4)}{R_2+R_3+R_4}=R_A-\left(\frac{F}{S}\right)R_A$$

where $F$ = the ratio of the amount of frequency change required to remove the frequency of oscillation out of a defined frequency band, with the center frequency of said band, and $S$ = the ratio, less than unity, of the percent change in resistance of the resistance leg, and the percent change in frequency of oscillation caused by the change of resistance of the resistance leg.

7. An apparatus as defined in claim 6 in which the filter network is comprised of a parallel-T R-C filter having a voltage gain greater than unity, and in which the amplifier has a voltage gain of less than unity, the combined loop voltage gain being greater than unity.

* * * * *